United States Patent [19]

Adler

[11] Patent Number: 5,533,419
[45] Date of Patent: Jul. 9, 1996

[54] CABLE LOCATOR/RETAINER

[75] Inventor: Felix Adler, Clinton Township, Mich.

[73] Assignee: Teleflex, Inc., Plymouth Meeting, Pa.

[21] Appl. No.: 408,898

[22] Filed: Mar. 22, 1995

[51] Int. Cl.⁶ ............................................. F16C 1/10
[52] U.S. Cl. .................. 74/502.4; 74/502.6; 411/436; 411/918
[58] Field of Search .................. 74/502.4, 502.6; 411/371, 377, 436, 918; 403/342, 343; 285/133.1; 248/51, 52, 65

[56] References Cited

U.S. PATENT DOCUMENTS

| 959,076 | 5/1910 | Scanlon | 248/65 |
|---|---|---|---|
| 2,551,710 | 5/1951 | Slaughter | 285/133.1 |
| 2,936,982 | 5/1960 | Cushenberry | 248/74.3 |
| 3,031,911 | 5/1962 | Despard | 411/918 |
| 3,263,948 | 8/1966 | Conrad | 248/74.3 |
| 3,362,280 | 1/1968 | Muller | 411/918 |
| 3,531,068 | 9/1970 | Fischer | 411/918 |
| 3,776,092 | 12/1973 | Seckerson | 85/5 R |
| 4,011,770 | 3/1977 | Webb | 74/501 R |
| 4,023,435 | 5/1977 | LaDue | 74/501 P |
| 4,185,515 | 1/1980 | Webb | 74/501 P |
| 4,909,218 | 3/1990 | Uuskallio | 74/502.6 |
| 5,050,445 | 9/1991 | Duffy | 74/502.5 |

FOREIGN PATENT DOCUMENTS 792266  3/1958  United Kingdom.

Primary Examiner—Charles A. Marmor
Assistant Examiner—Chong H. Kim
Attorney, Agent, or Firm—Howard & Howard

[57] ABSTRACT

An intermediate retainer (20) for a motion transmitting remote control assembly (10) of the type for transmitting motion along a curved path includes a cylindrical sleeve (24) freely slidably surrounding a conduit (12). A cylindrical socket (26) extends perpendicularly from the sleeve (24) and includes eight elongated and resiliently deformable internal ribs (42, 44) which extend at alternating angles about an inner wall (34) of the socket (26). The socket (26) is pressed over an extending threaded shaft (22), such as found in the engine compartment of a motor vehicle, so that the ribs (42, 44) are deformed over and tenaciously grip about the threads on the shaft (22) to help hold the conduit (12) in a routed path.

11 Claims, 3 Drawing Sheets

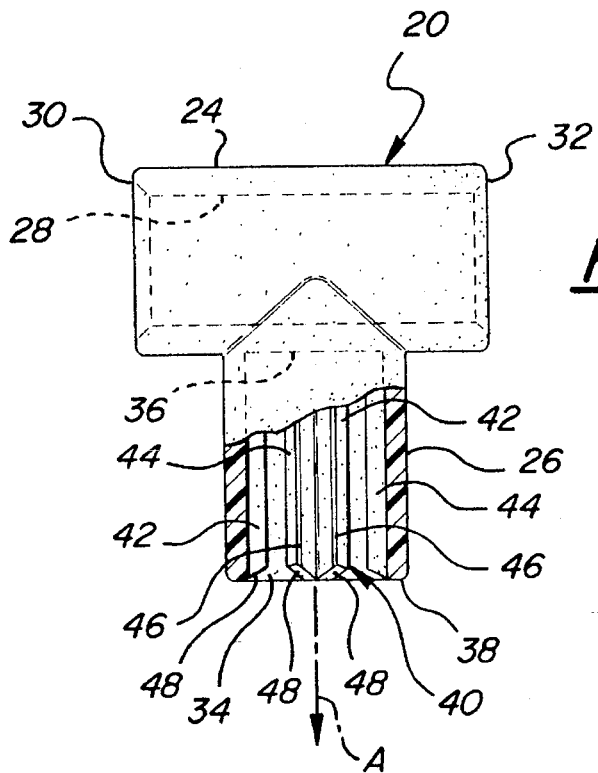
*FIG-3*
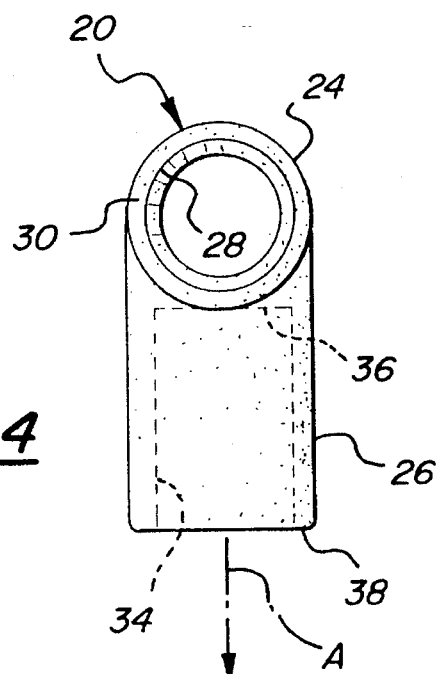
*FIG-4*
*FIG-5*
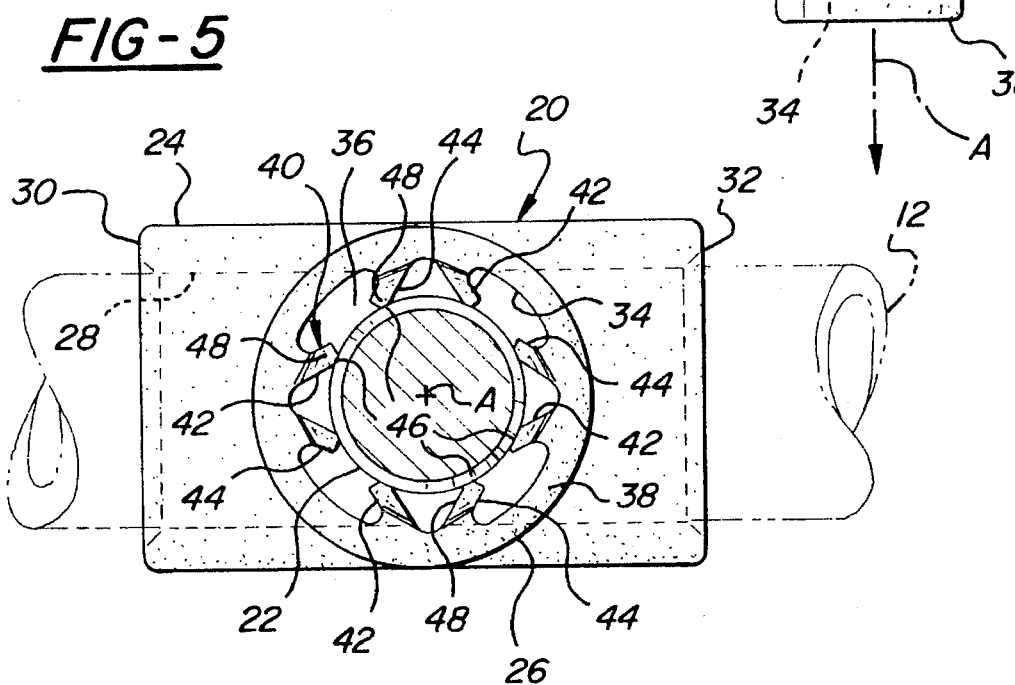

CABLE LOCATOR/RETAINER

TECHNICAL FIELD

The subject invention relates to motion transmitting remote control assembly of the type for transmitting motion along a curved path, and more particularly to such an assembly including an improved retainer construction for securing a conduit of the assembly in a tortiously routed path and/or for attaching a core element of the assembly to a controlling or controlled member.

BACKGROUND OF THE INVENTION

Remote control assemblies for transmitting motion in a curved path are used in automotive, aircraft and marine applications to mechanically control or manipulate such devices as throttles, transmissions, vents, cruise controls, steering elements and the like from a remote or distant location. In general, these assemblies include a flexible tubular conduit which supports a sliding flexible motion transmitting core element. Usually two fittings are secured to the conduit, one at each end, for attaching the conduit to a frame or other fixed structure in a tortiously routed path between the controlling and controlled members. The tortious routing is required to avoid engines, hot exhaust pipes, moving components, walkways and the like. In many applications, the conduit must further be attached at one or more intermediate locations along its length to the fixed supporting structure so that it will remain in the routed path.

For this purpose, the prior art teaches both end and intermediate retainers of various forms which attach to the conduit and which include some form of anchor device for securing to a fixed supporting structure. For example, U.S. Pat. No. 4,185,515 to Webb, issued Jan. 29, 1980 and assigned to the assignee of the subject invention, along with U.S. Pat. No. 3,776,092 to Seckerson, issued Dec. 4, 1973, disclose retainers for motion transmitting remote control assemblies. Each of these prior art retainers include a connector attached to the conduit, along with a push-in style anchor forced into in a formed aperture in a supporting sheet metal structure.

While these prior art end and intermediate retainers perform satisfactorily, they possess certain inherent disadvantages. For example, the anchor portion of the retainers require an aperture to be formed in an existing sheet metal portion or a bracket of the fixed supporting structure. In the example of an automotive engine compartment, the aperture must be formed in a hole in either the fire wall or a fender or a dedicated bracket or the like. Such holes in the sheet metal are generally disfavored as requiring additional labor in forming the hole as well as a coordinated effort between the stamping die manufactures for the sheet metal components and the motion transmitting remote control assembly manufacturers for the retainer component. Also, dedicated brackets significantly increase costs.

An alternative prior art intermediate retainer is disclosed in British Patent Specification No. 792,266, published Mar. 26, 1958. This reference discloses a T-shaped intermediate retainer having a split sleeve for receiving a conduit or the like, and a threaded socket which is screwed onto any convenient extending threaded shaft. The advantage of this design is that, particularly in automotive engine compartment environments, threaded shafts can be found at numerous convenient positions within the engine compartment. The primary disadvantages of this design, however, are that the socket portion must be manually threaded onto the threaded shaft which is a time consuming operation and conducive to Carpal Tunnel Syndrome in the installer. Furthermore, the split sleeve for retaining the conduit, which is required because the socket is threaded onto the extending shaft prior to insertion of the conduit within the sleeve, necessitates use of a flexible and resilient material to receive the conduit through the slit. This means that the sleeve material is relatively soft and can permit the conduit to become detached during operation. Additionally, because the intermediate retainer is disconnected from the conduit while it is threaded onto the extending shaft, it can be dropped or lost by the installer, thereby contributing to further time consumption and frustration.

SUMMARY OF THE INVENTION AND ADVANTAGES

The subject invention relates to threaded shaft in combination with a motion transmitting remote control assembly of the type for transmitting motion along a curved path. The combination comprises a threaded shaft, a flexible tubular conduit and a flexible core element slidably supported in the conduit. A retainer is disposed about either the conduit or the core element for attachment to the threaded shaft to hold the conduit in a routed path or to attach the core element to a controlling or controlled member. The subject retainer is characterized by including a press fit gripping means for surrounding the threaded shaft and exerting a continuous clamping force on the helical thread of the threaded shaft as the retainer is forcibly pressed onto the threaded shaft to permit rapid and secure engagement thereto.

The subject invention uniquely combines the numerous advantages found in the various prior art retainers, while eliminating all inherent disadvantages thereof. The press fit gripping means allows quick and convenient attachment to any conveniently located threaded shaft, such as a bolt shaft used in fastening two unrelated components in the engine compartment of an automobile. Because the threaded shaft is already in place performing some other fastening function, the subject retainer does not require any additional constructions or formations, such as preformed holes or dedicated brackets, for its use. The unique press fit gripping means also eliminates or substantially reduces the tendency to cause Carpal Tunnel Syndrome in the installer.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a front elevation view in partial cross section of the intermediate retainer;

FIG. 4 is an end view of the intermediate retainer;

FIG. 5 is a view as taken along lines 5—5 of FIG. 2; and

DESCRIPTION OF THE PREFERRED EMBODIMENT

Figure 1:
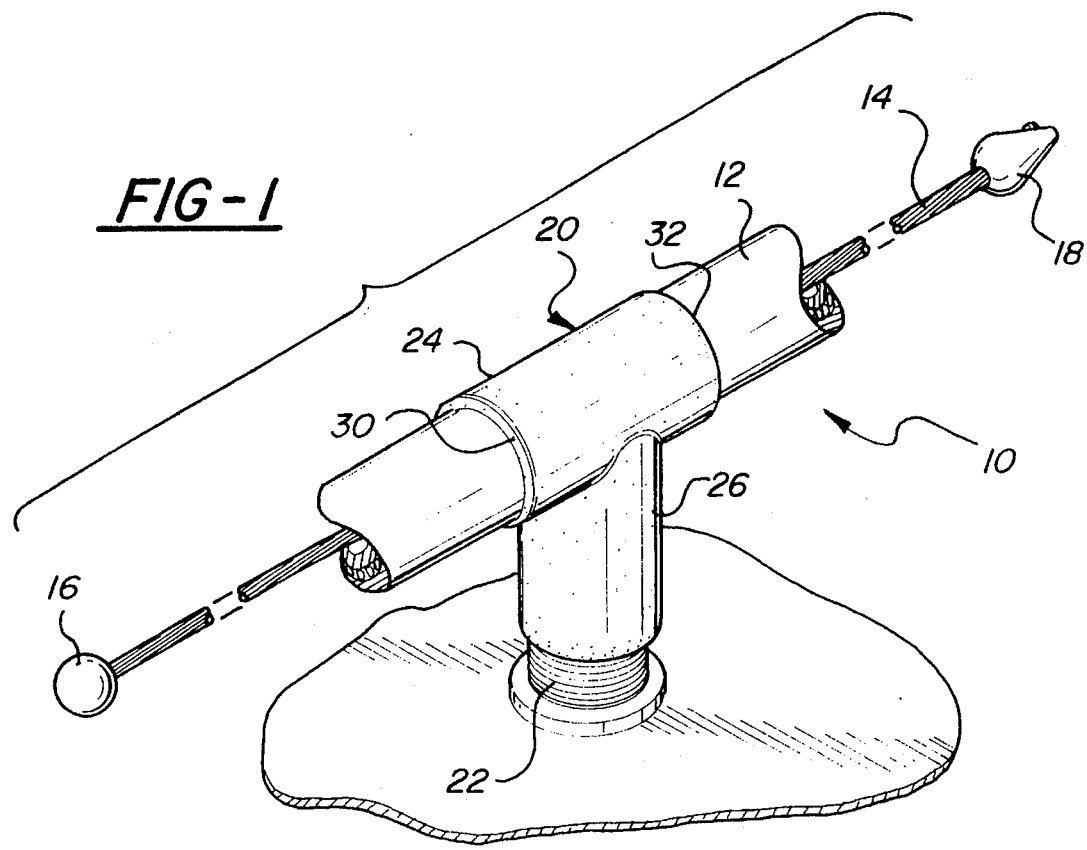
FIG. 1 is fragmentary perspective view of a conduit and core element supported within an intermediate retainer of the subject invention and disposed on a extending threaded shaft.

Referring to the Figures, wherein like numerals indicate like or corresponding parts throughout the several views, a motion transmitting remote control assembly is generally shown as 10 in FIG. 1. The assembly 10 is of the type for transmitting motion along a curved path, and it is particularly adapted for use in automotive, aircraft and marine environments to mechanically transmit movement between a controlling member and a remotely located controlled member. The assembly 10 includes a conduit 12 preferably of the type utilized in automotive applications including an inner tubular member over an organic polymeric material surrounded by a plurality of filaments or long lay wires wound in a long lead and encased in an outer jacket of organic polymeric material. A core element 14 is slidably supported within the conduit 12 along its length. The core element 14 may include any one of various end fittings 16, 18 adapted for attachment to controlling and controlled members. The conduit 12 and core element 14 general construction and function are typical of the prior art, such as that disclosed in U.S. Pat. No. 4,185,515 to Webb, issued Jan. 29, 1980, the disclosure of which is hereby incorporated by reference.

Figure 2:
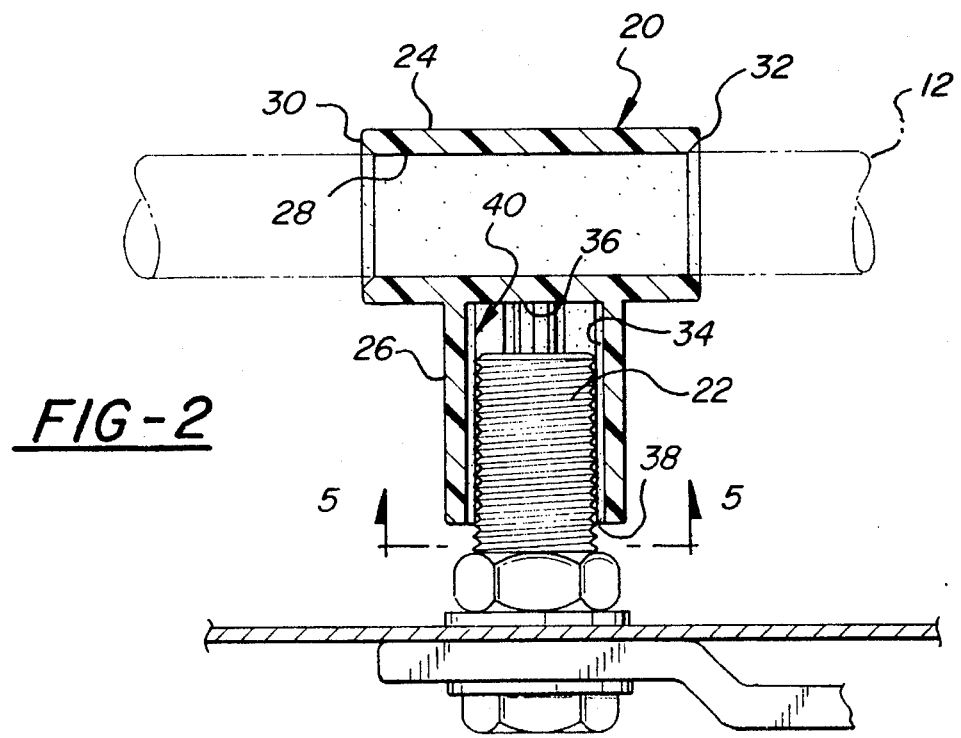
FIG. 2 is a cross-sectional view of the subject intermediate retainer disposed over an extending threaded shaft.
Figure 6:
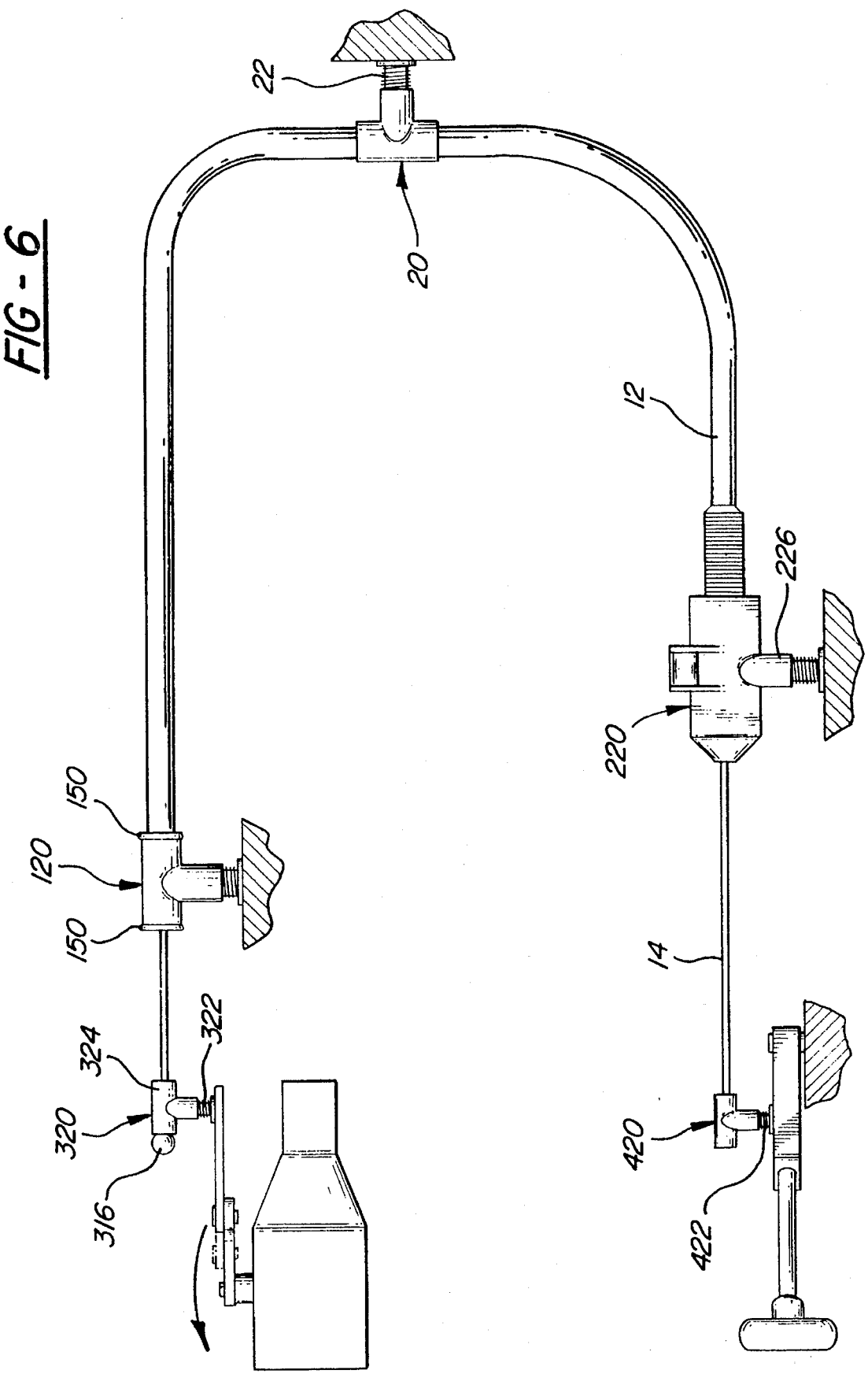
FIG. 6 is an assembly view showing the subject retainer in various alternative embodiments.

In use, the conduit 12 and core element 14 are routed in a predetermined path which often includes curves and sharp twists, such as shown in FIG. 6. When routed through the engine compartment in an automobile, the sharp turns and twists are intended to safely route the assembly 10 around the engine, hot exhaust systems and other moving or harsh components. In order to hold the assembly 10 in this routed path, the two ends of the conduit 12 are provided with retainers which attach to a fixed supporting structure. An intermediate retainer, generally indicated at 20, is disposed about the conduit 12 at some point between the ends of the conduit 12. The intermediate retainer 20 is specially adapted for attachment to an extending threaded shaft 22 to help hold the conduit 12 in the routed path. The threaded shaft 22 is of the usual type including a helical thread defining a major crest diameter and a minor root diameter. As shown in FIG. 2, the threaded shaft 22 may be an unused portion of bolt whose primary function is to fasten two unrelated components. Nevertheless, the threaded shaft 22 provides a secure and stable anchorage with which to retain the conduit 12 via the intermediate retainer 20 in the routed path. Those skilled in the art will readily appreciate that the intermediate retainer 20 can be easily modified for use as a conduit end retainer or as a core element retainer, however, as shown in FIG. 6 and described in detail below.

The intermediate retainer 20 includes a tubular sleeve 24 surrounding the conduit 12 and an adjoining tubular socket 26 having an imaginary central axis A. The sleeve 24 comprises an unbroken cylindrical body having a smooth inner surface 28. The diameter of the inner surface 28 is dimensioned slightly larger than the outer diameter of the conduit 12, so that there is free sliding and rotating movement between the conduit 12 and the intermediate retainer 20. Of course, those skilled in the art will readily appreciate that if the intermediate retainer 20 is modified for use as an end retainer, it will not freely slide along the conduit 12 but may, if desired, still freely rotate about the conduit 12. The sleeve 24 includes chamfered first 30 and second 32 ends to facilitate assembly with the conduit 12 during fabrication of the remote control assembly 10.

The socket 26 is also a generally cylindrical member having a generally cylindrical inner wall 34 centered about the central axis A. The inner wall 34 extends from a partition-like base 36 adjacent the sleeve 24 to a mouth 38. The diameter of the inner wall 34 is greater than the major crest diameter of the threaded shaft 22, for reasons to be described subsequently. The socket 26 intersects the sleeve 24 generally perpendicularly and generally midway between its first 30 and second 32 ends to form a T-shaped member. The outer diameter of the tubular sleeve 24 is substantially equal to the outer diameter of the tubular socket 26 as best shown in FIGS. 4 and 5, however these relationships will change depending upon the diameters of the conduit 12 and the threaded shaft 22. Preferably, the intermediate retainer 20 is fabricated in an injection molding operation from a plastic material, which may be heat resistant.

The intermediate retainer 20 includes a press fit gripping means, generally indicated at 40 in FIGS. 2, 3 and 5, for surrounding the threaded shaft 22 and exerting a continuous inward clamping force on the helical thread of the threaded shaft 22 as the intermediate retainer 20 is forcibly pressed onto the threaded shaft 22 to permit rapid and secure engagement thereto. The press fit gripping means 40 allows the intermediate retainer 20, which in the preferred embodiment is preassembled to the conduit 12, to be quickly and easily pressed over the unused end of an extending shaft 22 to help hold the conduit 12 in its routed path. The press fit gripping means 40 includes a plurality of elongated and resiliently deformable ribs 42, 44. The ribs 42, 44 extend inwardly from the inner wall 34 of the socket 26 and run generally parallel to the central axis A. In the preferred embodiment, the ribs 42, 44 extend continuously from the base 36 to the mouth 38 and parallel to the central axis A.

As best shown is FIGS. 3 and 5, the ribs 42, 44 each have a sheet-like or flange-like construction which is generally rectangular in cross sections taken perpendicular to the central axis A. These ribs 42, 44 project inwardly from the inner wall 34 at angles askew to the central axis A. In other words, the ribs 42, 44 do not radiate directly toward the central axis A, but instead are offset at angles between 15° and 85° from the radial. Angles of approximately 30° from the radial have been found to provide satisfactory results.

The ribs 42, 44 are arranged so that each rib is skewed in an opposite angular direction from the next adjacent rib. For example, as illustrated in FIG. 5, the ribs 42 are skewed in what can be considered a clockwise direction about the central axis A, whereas the interposed ribs 44 are skewed in what can be considered a counter-clockwise direction relative to the central axis A. The ribs 42, 44 thus alternate about the inner periphery of the socket 26 and are arranged so that their respective gripping edges 46 are disposed in equal arcuate and radial increments about the central axis A. In the preferred embodiment, there are provided eight such ribs 42, 44, and therefore the respective gripping edges 46 are located 45° apart.

As shown in FIGS. 3 and 5, the gripping edges 46 may be beveled to somewhat conform to the circumference of the threaded shaft 22. Also, the end of each rib 42, 44, adjacent the mouth 38, includes a chamfer 48 to facilitate centralized positioning and to help ease installation over the threaded shaft 22. In the free state, or pre-installation, condition, the gripping edges 46 are arranged in a circular pattern about the control axis A, having an inner diameter spacing less than the major crest diameter of the threaded shaft 22.

In operation, the intermediate retainer 20 is preassembled to the conduit 12 and freely slidably disposed therealong so that once the assembly 12 is positioned in a routed path, such as within the engine compartment of a motor vehicle, the intermediate retainer 20 can be slid and/or rotated into position and quickly press fit onto a threaded shaft 22. This quick and convenient procedure reduces the time required by the installer, as well as reduces the tendency to inflict Carpal Tunnel Syndrome on the installer. Moreover, with a few simple design modifications, the intermediate retainer 20 can be used as an end retainer for the conduit 12 as further described below.

Furthermore, once installed over a threaded shaft 22, the intermediate retainer 20 securely holds the conduit 12 in position by way of the ribs 42, 44 which tenaciously grip the helical thread on the threaded shaft 22. The ribs 42, 44 are dimensioned so that as the intermediate retainer 22 is pressed over the end of the threaded shaft 22, the ribs 42, 44 are deflected slightly outwardly and their respective gripping edges 46 caused to deform around the often sharp crest of the helical thread on the threaded shaft 22. This, coupled with the skewed and alternating angular orientation of the ribs 42, 44, reduces the tendency of the intermediate retainer 20 to twist about the threaded shaft 22. This results in a secure, convenient and inexpensive method of retaining the conduit 12 in the routed path.

Moreover, because the sleeve 24 is dimensioned to allow free sliding and rotating movement of the conduit 12 while the intermediate retainer 20 is attached to a threaded shaft 22, there is less tendency for the core element to lash or buckle during operation. Additionally, the free movement between the conduit 12 and the intermediate retainer 20 completely eliminates the need to preposition the intermediate retainer 20 on the conduit 12 during the initial fabrication phase, thus further reducing the overall cost of manufacture.

Referring to FIG. 6, various alternative embodiments of the subject retainer are shown. A rotatable conduit end retainer 120 is captured between two flanges 150. The conduit end retainer 120 is thus free to rotate about the conduit 12 but held in place at its end. Those skilled in the art will readily appreciate that the conduit end retainer 120 could, in the alternative, be fixedly mounted to or molded directly on the conduit 12 so that it is not rotatable. At the other end of the conduit 12 is shown a length adjustment mechanism 220 including a socket portion 226 identical to that described above in connection with FIGS. 1–5. As will become apparent to those skilled in the art, the conduit 12 length adjustment mechanism 220 including the socket 226 could be easily modified to operate as a core element 14 length adjustment mechanism.

In FIG. 6, two additional alternative embodiments of the subject retainer are also shown. At one extending end of the core element 14, a core element retainer 320 is slidably disposed therealong. An end fitting 316 crimped or molded on the tip of the core element 14 provides a stop against which the core element retainer 320 abuts. In this embodiment, the inner surface of the sleeve portion 324 is dimensioned slightly larger than the diameter of the core element 14. The threaded shaft 322, to which the retainer 320 is attached, is in turn connected to some controlling or controlled element. At the opposite extending end of the core element 14, yet another alternative core element retainer 420 is shown fixedly attached to the tip of the core element 14, such as by insert molding or the like. The associated threaded shaft 422 is connected to some controlled or controlling element.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. In combination a threaded shaft (22) and a motion transmitting remote control assembly (10) of the type for transmitting motion along a curved path, comprising;

a threaded shaft (22) having a helical thread defining a major crest diameter and a minor root diameter;

a flexible tubular conduit (12);

a flexible core element (14) slidably supported in said conduit (12);

a retainer (20) disposed about one of said conduit (12) and said core element (14) for attachment to said threaded shaft (22);

characterized by said retainer (20) including press fit gripping means (40) for surrounding said threaded shaft (22) and exerting a continuous inward clamping force on said helical thread of said threaded shaft (22) as said retainer (20) is forcibly pressed onto said threaded shaft (22) to permit rapid and secure engagement thereto; said press fit gripping means (40) including a plurality of elongated and resiliently deformable ribs (42, 44); said retainer (20) including an inner tubular sleeve (24) and an adjoining tubular socket (26) having an imaginary central axis (A); said socket (26) having a base (36) adjacent said sleeve (24) and a mouth (38) spaced therefrom; said ribs (42, 44) extending inwardly from said socket (26); said fibs (42, 44) extending generally parallel to said central axis (A); and said socket (26) including a generally cylindrical inner wall (34) centered about said central control axis (A); said ribs (42, 44) projecting inwardly from said inner wall (34) at angles askew to said central axis (A).

2. An assembly (10) as set forth in claim 1 wherein each said rib (42, 44) is skewed in an opposite angular direction from the next adjacent rib (42, 44).

3. An assembly (10) as set forth in claim 2 wherein eight of said ribs (42, 44) are arranged about said inner wall (34) of said socket (26).

4. An assembly (10) as set forth in claim 2 wherein each of said ribs (42, 44) extends continuously from said base (36) to said mouth (38).

5. An assembly (10) as set forth in claim 2 wherein each of said ribs (42, 44) includes a chamfer (48) adjacent said mouth (38).

6. An assembly (10) as set forth in claim 5 wherein said sleeve (24) comprises an unbroken cylindrical body having an inner surface (28).

7. An assembly (10) as set forth in claim 6 wherein said sleeve (24) includes spaced apart first (30) and second (32) ends, said socket (26) intersecting said sleeve (24) generally perpendicularly and generally midway between said first (30) and second (32) ends.

8. An assembly (10) as set forth in claim 7 wherein said inner surface (28) includes a chamfer adjacent each of said first (30) and second (32) ends.

9. An assembly as set forth in claim 8 wherein said retainer (20) is fabricated from a plastic material.

10. An assembly (10) as set forth in claim 9 wherein said sleeve (24) has an outer diameter and said socket (26) has an outer diameter substantially equal to said outer diameter of said sleeve (24).

11. A retainer (20) for a motion transmitting remote control assembly (10) of the type for transmitting motion along a curved path, said retainer (20) comprising:

a tubular sleeve (24) and an adjoining tubular socket (26) having an imaginary central axis (A);

said socket (26) including a generally cylindrical inner wall (34) centered about said central axis (A);

a plurality of ribs (42, 44) projecting inwardly from said inner wall (34) at angles askew to said central axis (A);

each said rib (42, 44) being skewed in an opposite angular direction from the next adjacent said rib (42, 44).

* * * * *